United States Patent
Kim et al.

(10) Patent No.: US 12,546,989 B2
(45) Date of Patent: Feb. 10, 2026

(54) PHOSPHOR WHEEL, ILLUMINATOR, AND PROJECTOR

(71) Applicant: LG ELECTRONICS INC., Seoul (KR)

(72) Inventors: Minsung Kim, Seoul (KR); Gunyoung Hong, Seoul (KR); Bokyung Kang, Seoul (KR); Seungmi Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 18/012,875

(22) PCT Filed: Jun. 30, 2020

(86) PCT No.: PCT/KR2020/008551
§ 371 (c)(1),
(2) Date: Dec. 23, 2022

(87) PCT Pub. No.: WO2022/004911
PCT Pub. Date: Jan. 6, 2022

(65) Prior Publication Data
US 2023/0280583 A1    Sep. 7, 2023

(51) Int. Cl.
*G02B 26/00* (2006.01)
*G03B 21/16* (2006.01)
*G03B 21/20* (2006.01)

(52) U.S. Cl.
CPC .......... *G02B 26/008* (2013.01); *G03B 21/16* (2013.01); *G03B 21/204* (2013.01); *G03B 21/2066* (2013.01)

(58) Field of Classification Search
CPC .... G02B 26/008; G03B 21/16; G03B 21/204; G03B 21/2066
USPC ........................................................... 353/31
See application file for complete search history.

(56) References Cited

U.S. PATENT DOCUMENTS

| | | | |
|---|---|---|---|
| 2012/0106126 A1 | 5/2012 | Nojima et al. | |
| 2014/0028984 A1* | 1/2014 | Osaka | G03B 21/204 353/31 |
| 2016/0252722 A1 | 9/2016 | Li et al. | |
| 2018/0003363 A1 | 1/2018 | Furuyama | |
| 2018/0348614 A1 | 12/2018 | Zhang et al. | |
| 2020/0249554 A1* | 8/2020 | Kobayashi | F21V 7/26 |

FOREIGN PATENT DOCUMENTS

| | | | |
|---|---|---|---|
| CN | 207922119 U | * | 9/2018 |
| CN | 208421409 U | * | 1/2019 |
| JP | 2011-180353 A | | 9/2011 |

(Continued)

OTHER PUBLICATIONS

Translation of JP_2017203184_A (Year: 2025).*

(Continued)

*Primary Examiner* — Jerry L Brooks
(74) *Attorney, Agent, or Firm* — Birch, Stewart, Kolasch & Birch, LLP

(57) ABSTRACT

A phosphor wheel comprising: a substrate having a recess, a phosphor layer disposed in the recess, and a first reflection layer surrounding the substrate. Thus, heat emission efficiency is increased, and it is possible to prevent defects such as cracking or discolouration of the phosphor layer.

19 Claims, 9 Drawing Sheets

(56) References Cited

FOREIGN PATENT DOCUMENTS

| | | | |
|---|---|---|---|
| JP | 2012-98442 A | 5/2012 | |
| JP | 2012-108435 A | 6/2012 | |
| JP | 2015-118139 A | 6/2015 | |
| JP | 2017203184 A | * 11/2017 | ............ B32B 15/01 |
| KR | 10-2016-0070121 A | 6/2016 | |
| KR | 10-2017-0113533 A | 10/2017 | |
| KR | 10-2018-0093938 A | 8/2018 | |
| KR | 20180089426 A | * 8/2018 | |

OTHER PUBLICATIONS

Translation of CN_207922119_U (Year: 2025).*
Translation of CN_208421409_U (Year: 2025).*
Translation of KR_20180089426_A (Year: 2025).*
International Search Report for PCT/KR2020/008551 mailed on Mar. 29, 2021.

* cited by examiner

【Figure 1】
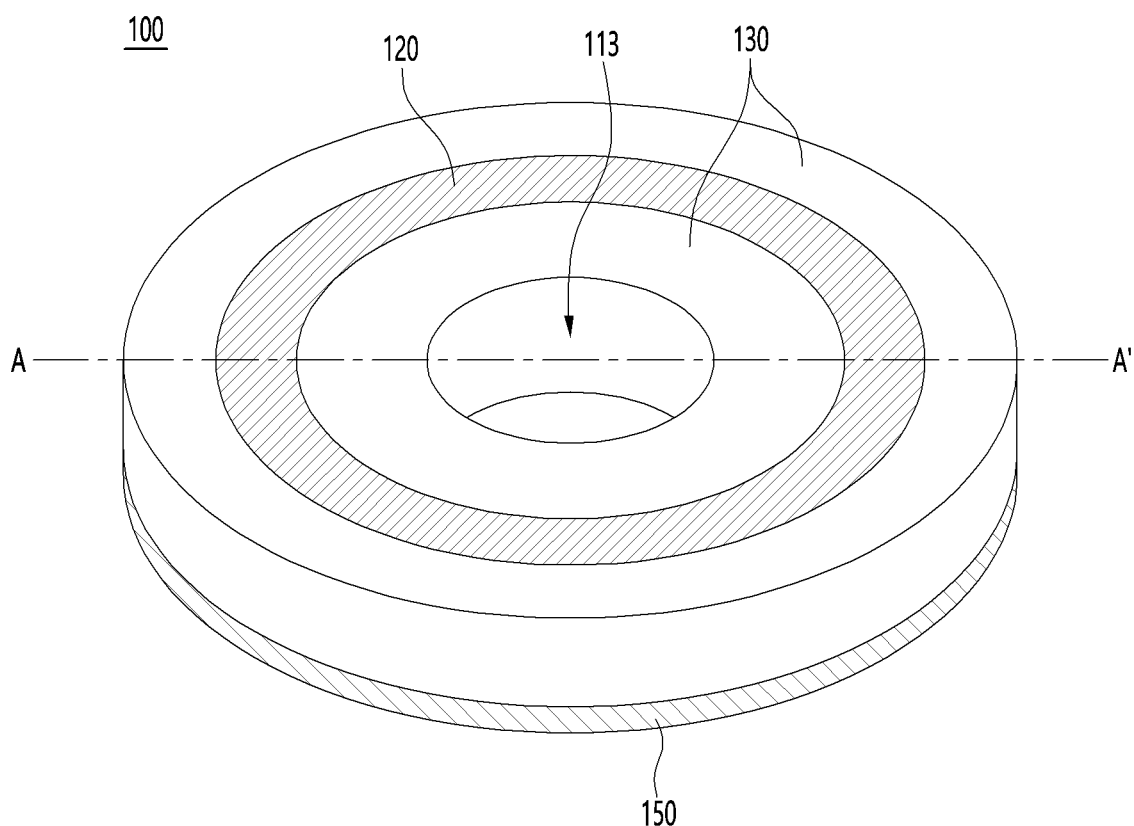
【Figure 2】
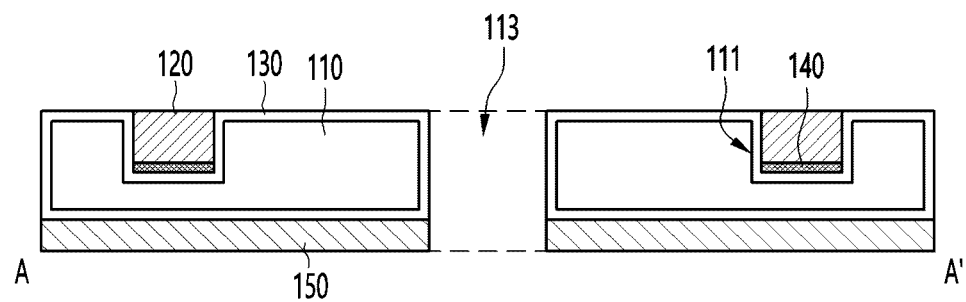

【Figure 3】
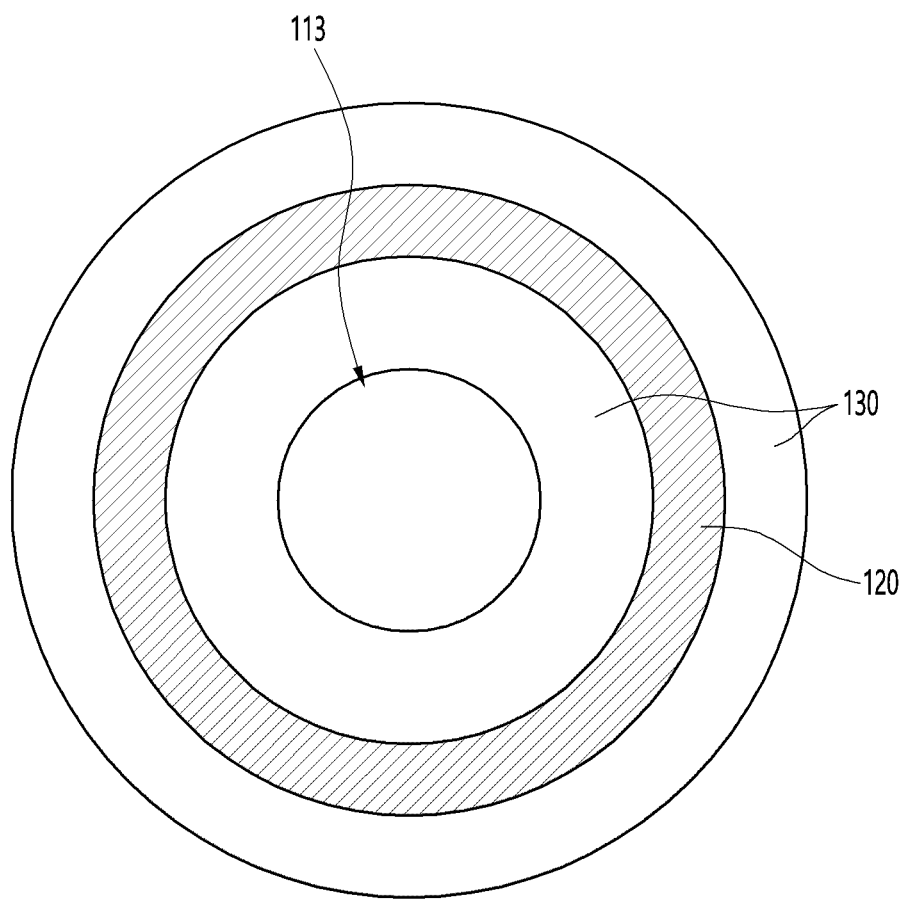

【Figure 4】
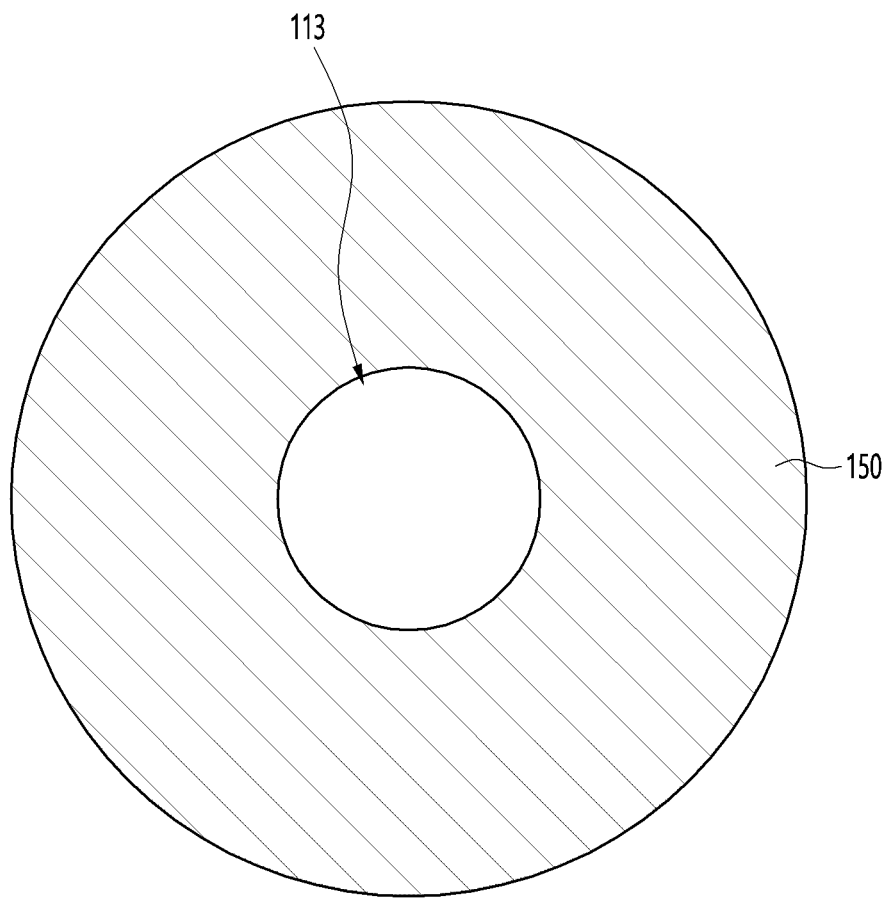
【Figure 5】
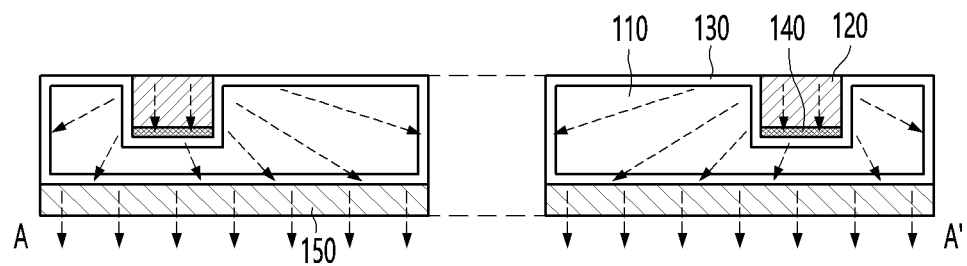

【Figure 6】
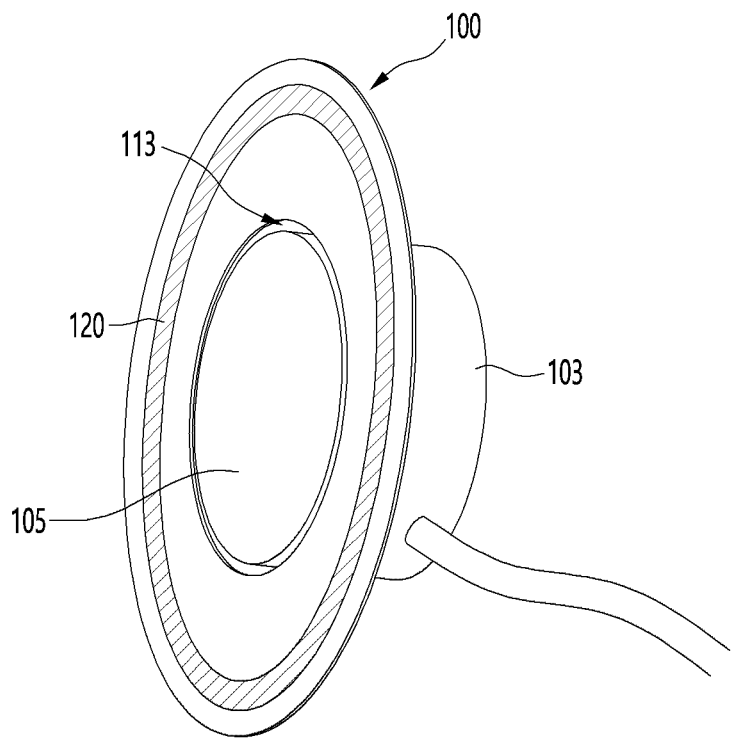
【Figure 7a】
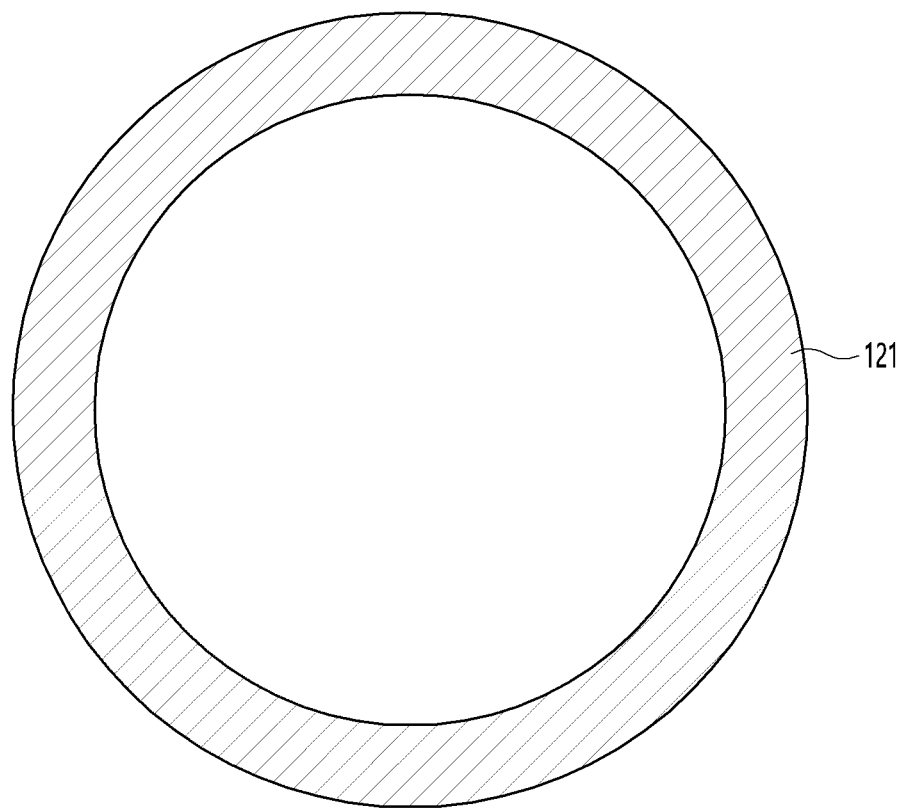

【Figure 7b】
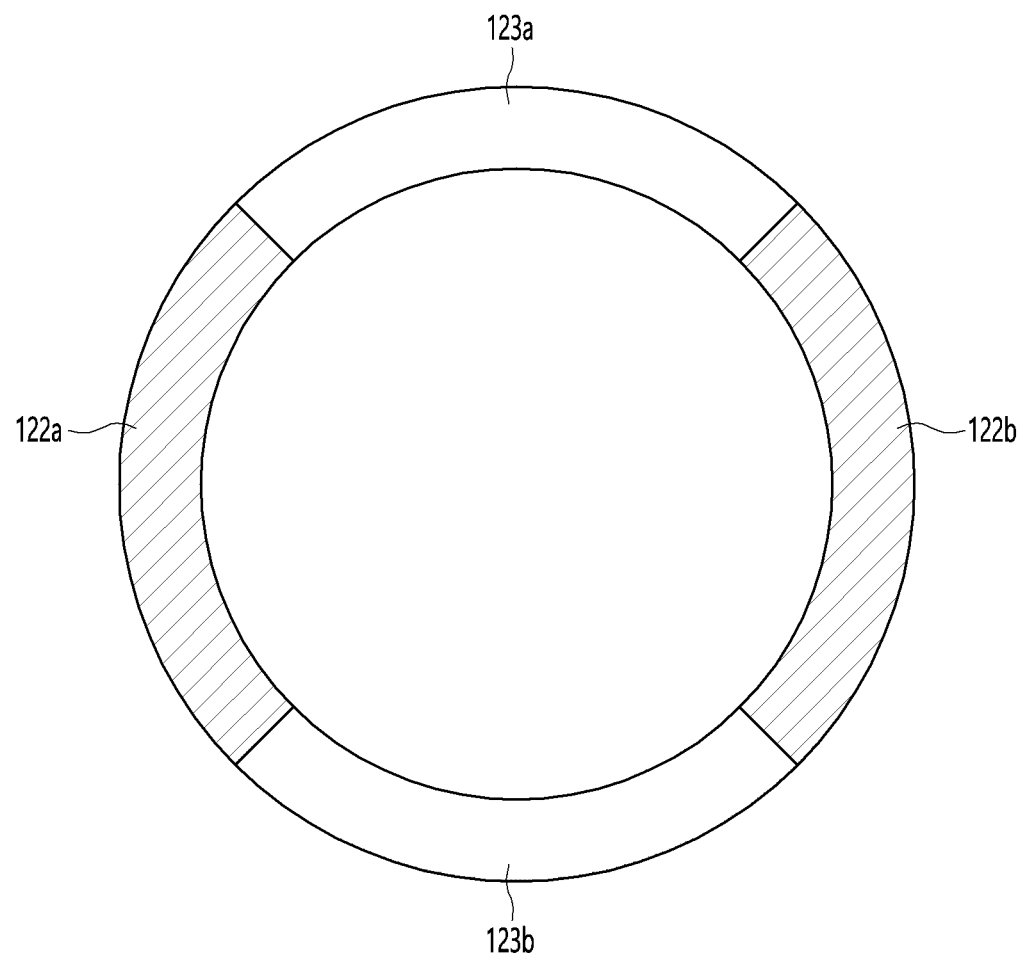

【Figure 7c】
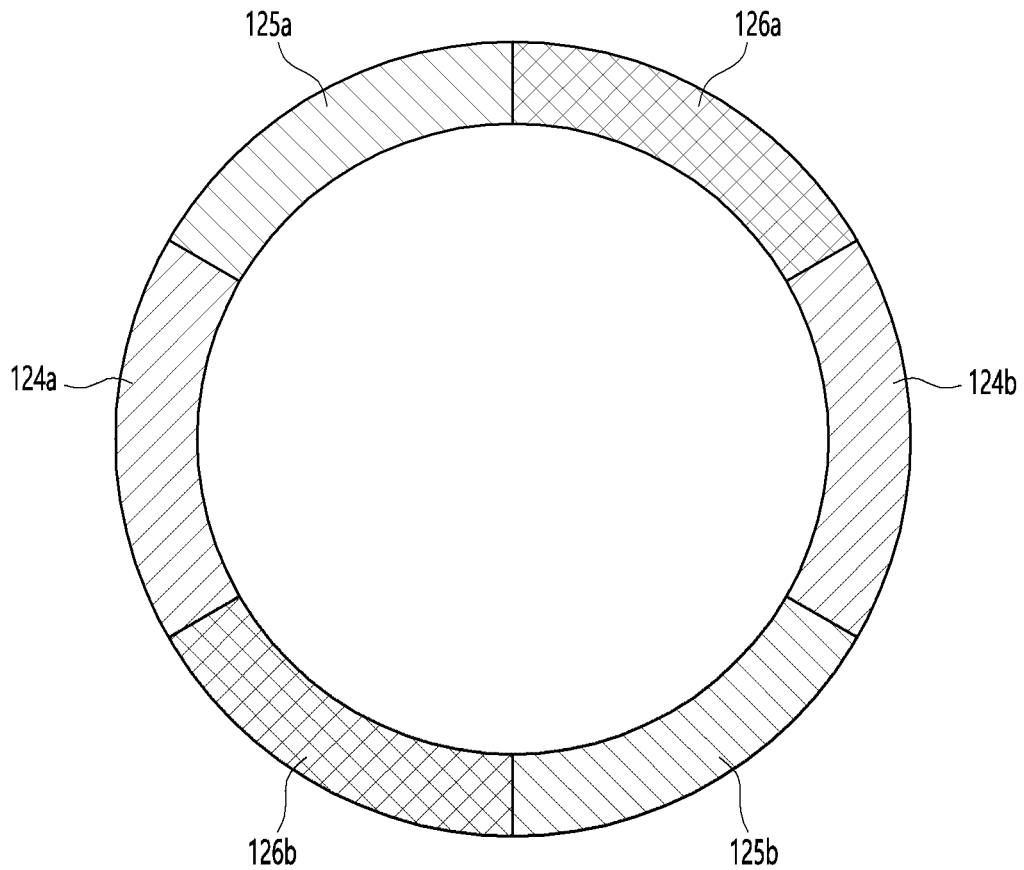
【Figure 8】
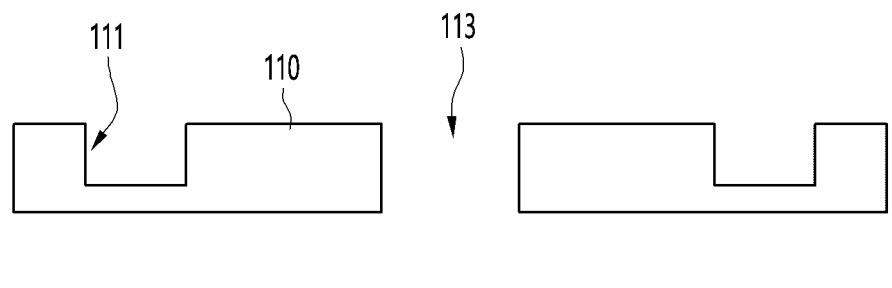
【Figure 9】
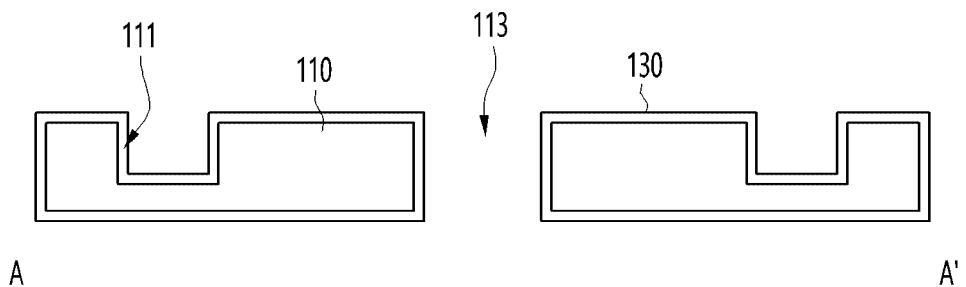

【Figure 10】
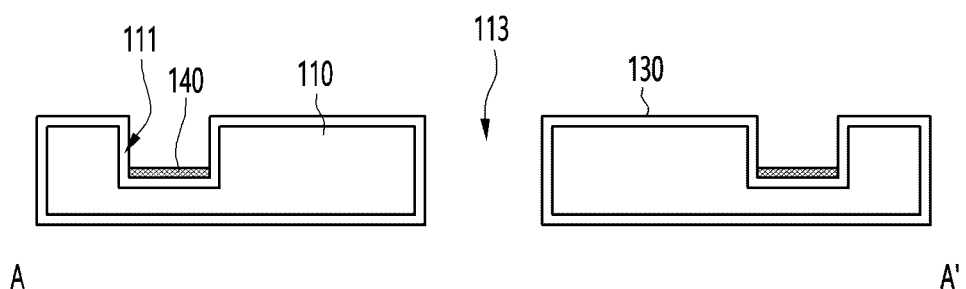
【Figure 11】
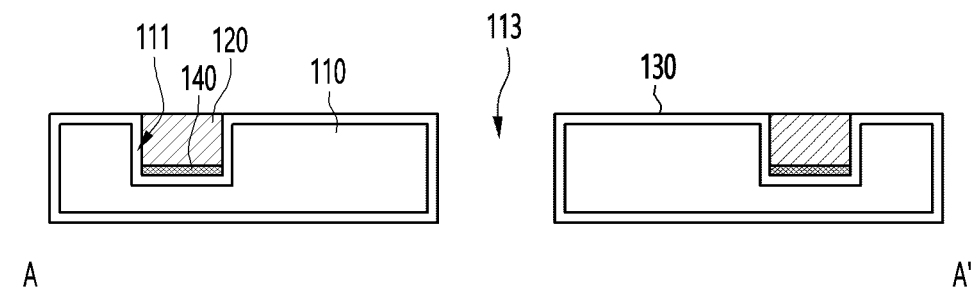
【Figure 12】
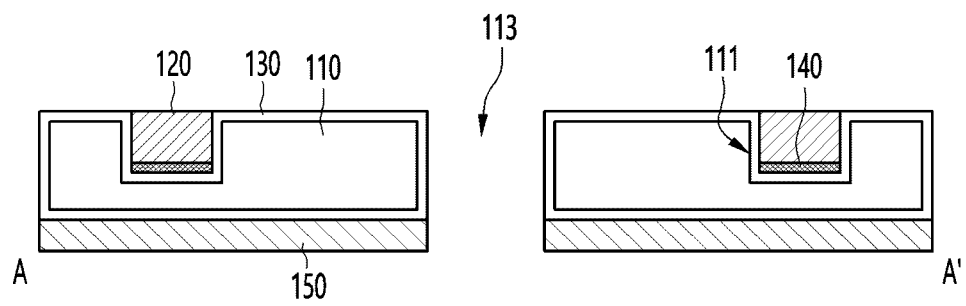

【Figure 13】
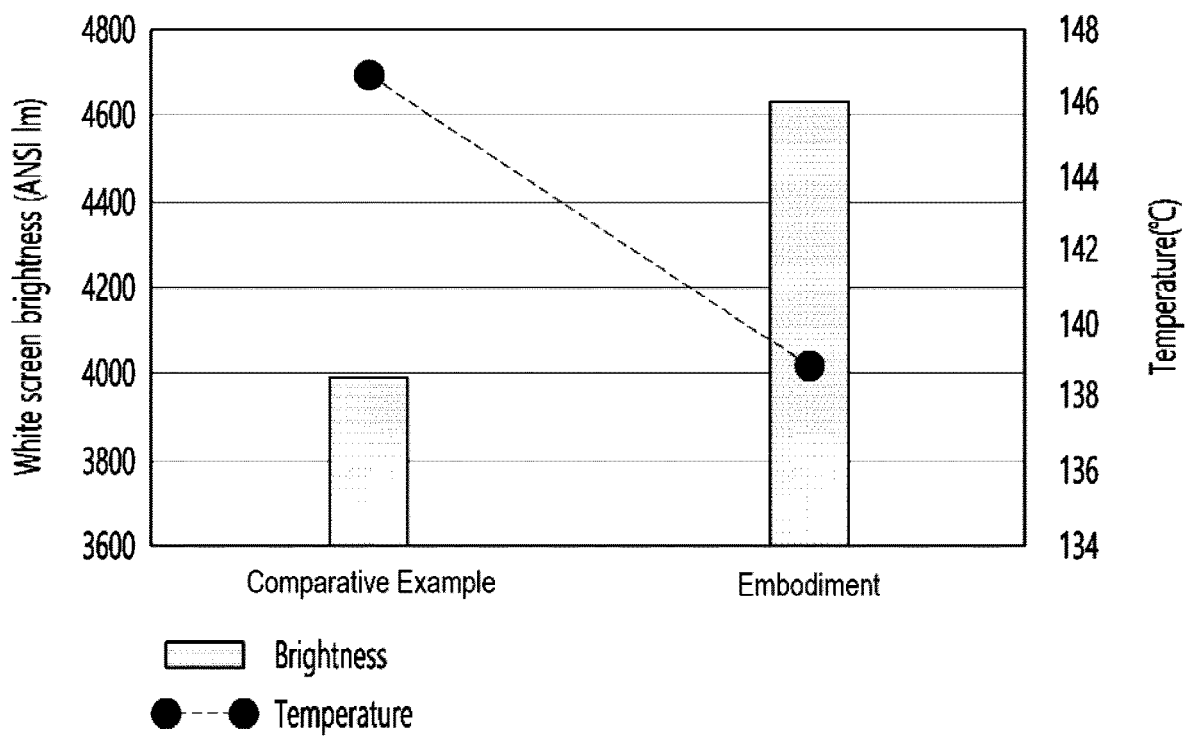
【Figure 14】
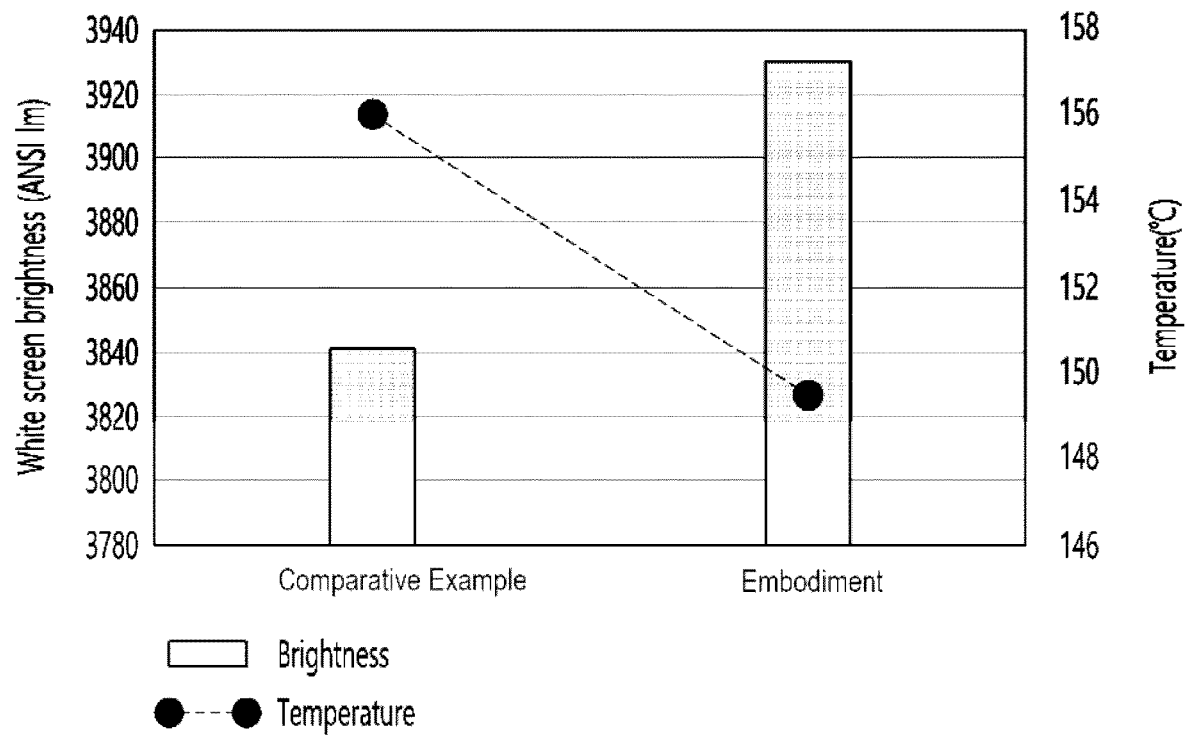

【Figure 15】
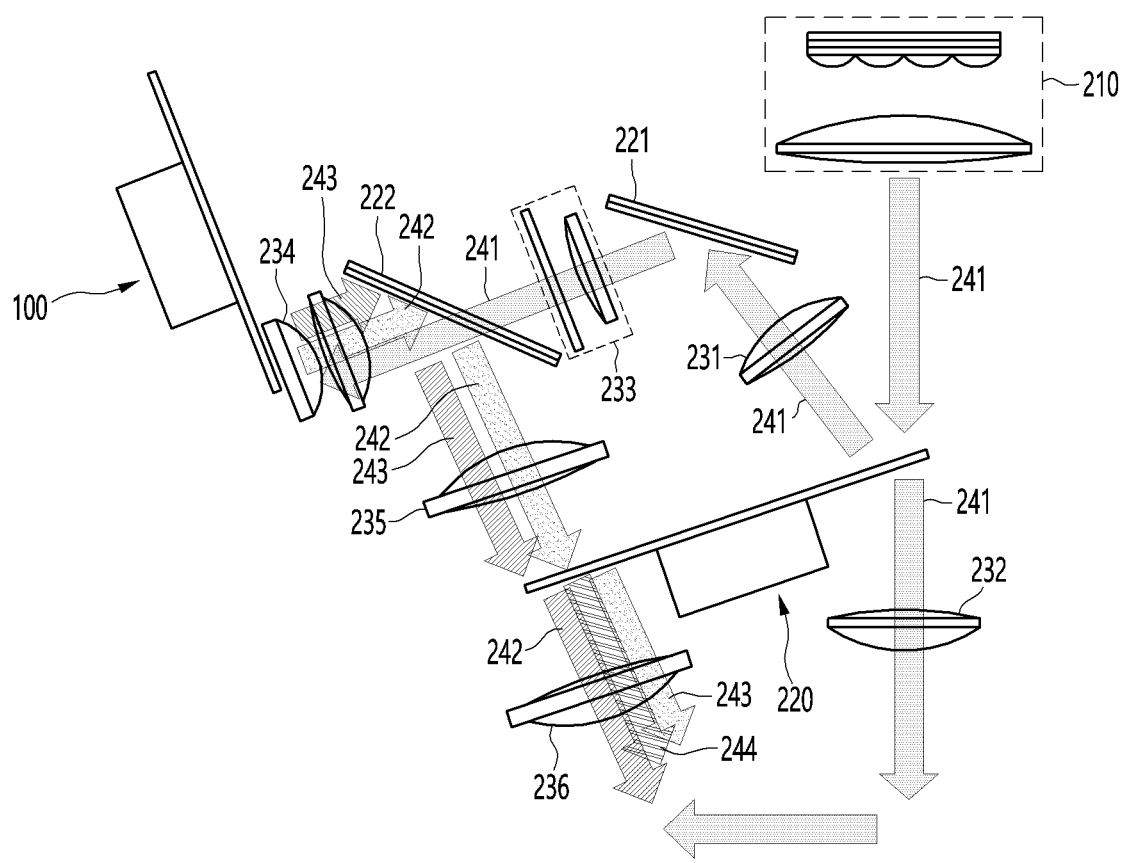

PHOSPHOR WHEEL, ILLUMINATOR, AND PROJECTOR

CROSS REFERENCE TO RELATED APPLICATION

This application is the National Phase of PCT International Application No. PCT/KR2020/008551, filed on Jun. 30, 2020, which is hereby expressly incorporated by reference into the present application.

TECHNICAL FIELD

An embodiment relates to a phosphor wheel, alighting system and a projector.

BACKGROUND ART

A project that projects images onto screens are used in various places, such as conference rooms, classrooms, home theaters, and theaters.

A semiconductor light emitting device is used as a light source for the lighting system of such a projector.

A first light generated by the light source is irradiated onto the phosphor layer provided in the phosphor wheel, a second light of a wavelength different from a wavelength of the light is generated, and the first light and the second light are used to implement the image.

When a high-powered light source is irradiated onto the phosphor layer, heat is generated in the phosphor layer by the high-powered light source. Defects such as discoloration or cracking of the phosphor layer are caused by this heat.

In addition, there is a problem in that the brightness performance of the light generated in the phosphor layer is deteriorated by the heat generated in the phosphor layer.

DISCLOSURE

Technical Problem

The embodiment aims to solve the aforementioned problem and other problems

Another object of the embodiment provides a phosphor wheel, a lighting system and a projector capable of easily dissipating heat.

Another object of the embodiment provides a phosphor, a lighting system and a projector capable of preventing defects such as discoloration or cracking of the phosphor layer.

Another object of the embodiment provides a phosphor wheel, a lighting system and a projector capable of preventing degradation of the brightness performance.

Another object of the embodiment provides a phosphor wheel, a lighting system and a projector capable of ensuring high reliability and long lifespan.

Technical Solution

According to one aspect of the embodiment to achieve the above or other object, a phosphor wheel, comprising: a substrate comprising a recess; a phosphor layer disposed in the recess; and a first reflective layer surrounding the substrate.

According to another aspect of the embodiment, a lighting system, comprising: a light source configured to generate a laser light of a first wavelength band; and a rotatable phosphor wheel configured to receive the laser light of the first wavelength band and emit light of at least one or more wavelength bands, wherein the phosphor wheel comprises: a substrate comprising a recess; a phosphor layer disposed in the recess; and a first reflective layer surrounding the substrate.

According to another aspect of the embodiment, a projector comprises the lighting system.

Advantageous Effects

Effects of the phosphor wheel, the lighting system, and the projector according to the embodiment are described as follows.

According to at least one of the embodiments, since the first reflective layer covers the substrate, the surface of the substrate may be oxidized by high-temperature heat generated when the phosphor material is cured to form the phosphor layer. Accordingly, there is an advantage in that brightness performance can be prevented from deteriorating.

According to at least one of the embodiments, there is an advantage that by forming the substrate as a material with excellent thermal conductivity, the heat generated in the phosphor layer can be easily dissipated to the outside through the substrate.

According to at least one of the embodiments, there is an advantage in that the reflectance of the light excited in the phosphor layer is increased by the second reflective layer disposed in the recess such that the light efficiency can be improved.

According to at least one of the embodiments, since the heat radiation layer is disposed under the substrate, there is an advantage in that heat transferred to the substrate can be more efficiently discharged to the outside.

Further scope of applicability of the embodiment will be apparent from the following detailed description. However, since various changes and modifications within the thought and scope of the embodiment can be clearly understood by those skilled in the art, certain embodiments, such as detailed descriptions and preferred embodiments, should be understood as given merely as examples.

DESCRIPTION OF DRAWINGS

FIG. 1 is a view of the phosphor wheel according to an embodiment.

FIG. 2 is a cross-sectional view taken along the A-A' line of FIG. 1.

FIG. 3 is a plan view illustrating a phosphor wheel according to an embodiment.

FIG. 4 is a rear view showing a phosphor wheel according to an embodiment.

FIG. 5 shows the progression path of the heat generated in the phosphor layer.

FIG. 6 shows a state in which a motor is installed in a phosphor wheel.

FIG. 7a is a first example view of the phosphor layer provided in the phosphor wheel according to an embodiment.

FIG. 7b is a second example view of the phosphor layer provided in the phosphor wheel according to an embodiment.

FIG. 7c is a third example view of the phosphor layer provided in the phosphor wheel according to an embodiment.

FIG. 8 to FIG. 12 show a process of manufacturing a phosphor wheel according to an embodiment.

FIG. 13 shows changes in brightness and temperature according to a comparative example and an embodiment (when the phosphor layer is formed in the recess).

FIG. 14 shows changes in brightness and temperature according to a comparative example and an embodiment (when a thermal radiation layer is provided).

FIG. 15 shows a lighting system according to an embodiment.

MODE FOR INVENTION

Hereinafter, a preferred embodiment of the present invention will be described in detail with reference to the accompanying drawings. However, the technical spirit of the present invention is not limited to some embodiments described, but may be implemented in a variety of different forms, and within the scope of the technical spirit of the present invention, one or more of the components thereof may be selectively combined, displaced and used between the embodiments. In addition, the terms used in embodiments of the present invention (including technical and scientific terms) may be interpreted in a sense that is generally understandable to one of ordinary skill in the art to which the present invention belongs, unless expressly and specifically defined and described, and commonly used terms, such as predefined terms, may be interpreted in consideration of the contextual meaning of the relevant technology. In addition, the terminology used in embodiments of the present invention is intended to describe embodiments and is not intended to limit the invention. In this specification, the singular form may also include the plural form unless otherwise specified in the phrase, and when it is described as "at least one (or more than one) of B and (and) C", It may comprise one or more of all combinations that can be combined with A, B, and C. In addition, in describing the components of embodiments of the present invention, terms such as first, second, A, B, (a), (b), and the like may be used. Such a term is intended to distinguish the component from other components only, and is not limited by the term to the nature, sequence, or order of the component. And, if a component is described as being 'connected', 'combined' or 'fastened' to another component, the component may comprise not only a direct connection, link, or connection to that other component, but also a case in which the component is 'connected', 'combined' or 'fastened' due to another component between the component and the other component. In addition, when it is described as forming or being disposed in the "upper (top) or bottom (bottom)" of each component, upper (top) or lower (bottom) includes a case in which two elements are in direct contact with each other, as well as a case in which one or more other elements are formed or disposed between the two elements. In addition, when expressed as "up (up) or down (down)", it may comprise not only the upward direction but also the meaning of the downward direction based on one component.

The Phosphor Wheel

FIG. 1 is a view of the phosphor wheel according to an embodiment, and FIG. 2 is a cross-sectional view taken along the A-A' line of FIG. 1. FIG. 3 is a plan view illustrating a phosphor wheel according to an embodiment, and FIG. 4 is a rear view showing a phosphor wheel according to an embodiment.

Referring to FIGS. 1 to 4, the phosphor wheel 100 according to the embodiment may comprises a substrate 110, a phosphor layer 120 and a reflective layer 130 (hereinafter referred to as a first reflective layer).

The phosphor wheel 100 according to an embodiment can excite the light irradiated during rotation to emit at least one or more lights having a different wavelength than a wavelength of the light. The irradiated light is light generated from the light source (210 of FIG. 15), which can be named the first light. For example, when a single phosphor layer is included in the phosphor wheel 100, a second light different from the first light may be emitted. For example, when the phosphor wheel 100 includes first to third phosphor layers, second to fourth lights different from the first light may be emitted. This will be described in detail later.

The phosphor wheel 100 according to an embodiment may be a member capable of rotating provided with a phosphor layer 120. When the light is irradiated in the phosphor layer 120 in a state in which the phosphor wheel 100 is rotating, the phosphor layer 120 is excited by the light, and light having a wavelength different from that of the light may be generated. For example, the phosphor layer 120 may comprise a single phosphor layer or two or more phosphor layers.

For example, the substrate 110 is a support member supporting the phosphor wheel 100, and may be formed of a material having excellent support strength. For example, the substrate 110 may be formed of a heat transfer member that transmits the heat of the phosphor layer 120 to the outside, and may be formed of a material with excellent thermal conductivity. For example, the substrate 110 may comprise metal. For example, the substrate 110 may comprise copper (Cu), but is not limited thereto.

When the substrate 110 is made of copper, the support strength of the substrate 110 is excellent and the heat transfer characteristics can be improved. Thus, the heat generated in the phosphor layer 120 by the substrate 110 can be quickly transmitted to a lower side of the substrate 110.

The substrate 110 may be referred to as a metal layer, a copper layer.

A fastening hole 113 may be formed on the substrate 110 to rotate the phosphor wheel 100. As shown in FIG. 6, a rotation shaft 105 of a motor 103 may be inserted and fastened into the fastening hole 113. The substrate 110 is rotated by the rotation of the rotation shaft 105 by the drive of the motor 103 such that the phosphor wheel 100 may be rotated.

For example, the substrate 110 may be a plate having lower and upper surfaces parallel to each other. For example, the substrate 110 may have a circular shape when viewed from above, but is not limited thereto. By having a circular shape of the substrate 110, even if the substrate 110 rotates at high speed by the motor 103, the centrifugal force transmitted to the outside of the substrate 110 is uniform and then shaking or vibration of the substrate 110 can be minimized.

For example, a thickness of the substrate 110 may be about 700 micrometer to about 1,500 micrometer. If the thickness of the substrate 110 is less than 700 micrometer, the heat transfer efficiency is reduced, and when the thickness of the substrate 110 is more than 1500 micrometer, the weight is increased, and then it is not easy to rotate the phosphor wheel 100. For example, the thickness of the substrate 110 may be about 700 micrometer to about 1,000 micrometer.

The recess 111 may be formed along the circumference of the substrate 110 on an upper surface of the substrate 110. The recess 111 may have a closed-loop shape. That is, the recess 111 may extend along the circumference of the substrate 110 at a first point and terminate at the first point. Thus, when the phosphor layer 120 is formed in the recess 111, the phosphor layer 120 may also have a closed-loop shape. Since the phosphor layer 120 has a closed-loop shape, when the substrate 110 rotates, light can be continuously irradiated without interruption by the closed-loop phosphor layer 120. Accordingly, another light generated by being excited by the phosphor layer 120 may also be continuously emitted without interruption.

For example, the shape of the recess 111 may have a circular shape when viewed from above. Since the recess 111 has a circular shape, the phosphor layer 120 formed in the recess 111 may also have a circular shape when viewed from above. In this case, since all regions of the phosphor layer 120 have the same radius at the center of the substrate 110, it can be irradiation with the phosphor layer 120 at a fixed point without the need for light to move.

For example, a depth of the recess 111 may be from about ½ to about ¾ of the thickness of the substrate 110. For example, if the thickness of the substrate 110 is 1,000 micrometer, the depth of the recess 111 may be 500 micrometer to 750 micrometer. If the depth of the recess 111 is less than ½ of the thickness of the substrate 110, since the phosphor layer 120 disposed in the recess 111 and a lower surface of the substrate 110 are far apart, heat dissipation efficiency may be reduced. If the depth of the recess 111 is more than ¾ of the thickness of the substrate 110, since the thickness of the substrate 110 between a bottom surface of the recess 111 and the lower surface of the substrate 110 is thin, the supporting force of the substrate 110 is reduced, and thus the substrate 110 may be bent.

The phosphor layer 120 may be disposed in the recess 111 of the substrate 110. As the phosphor layer 120 is disposed in the recess 111 of the substrate 110, the phosphor layer 120 can be stably attached to the substrate 110.

For example, the phosphor layer 120 may be made of YAG, LuAG, α—SiAlON, β—SiAlON, etc. For example, the phosphor layer 120 may be formed of a phosphor composition that is excited by light having a wavelength of 430 nm to 470 nm and emits visible light.

The phosphor layer 120 may have a member such as a paste, film, glass, sintering material containing a phosphor material. For example, the phosphor layer 120 may comprise a phosphor and a silicon resin. Resin may be used for methyl-based or phenyl-based resin, but is not limited thereto. For example, the phosphor layer 120 may comprise a phosphor and powder particles. For example, the phosphor layer 120 may comprise a phosphor and glass powder particles. For example, the phosphor layer 120 may comprise a ceramic phosphor.

For example, an upper surface of the phosphor layer 120 may be positioned on the same line as the upper surface of the substrate 110, but is not limited thereto.

A thickness of the phosphor layer 120 may be smaller than the depth of the recess 111. For example, the thickness of the phosphor layer 120 may be about 1 micrometer to about 500 micrometer. When the thickness of the phosphor layer 120 is less than 1 micrometer and the depth of the recess 111 is also less than 1 micrometer, a gap between the bottom surface of the recess 111 and the lower surface of the substrate 110 may be large. Accordingly, heat generated in the phosphor layer 120 is not well transferred to the lower surface of the substrate 110, and thus heat transfer efficiency may be reduced. When the thickness of the phosphor layer 120 is more than 500 micrometer, the light does not reach the lower side of the phosphor layer 120, the luminance of the light generated from the phosphor layer 120 may decrease due to deterioration of excitation performance.

For example, the thickness of the phosphor layer 120 may be about 100 micrometer to about 300 micrometer. For example, the thickness of the phosphor layer 120 may be about 100 micrometer to about 200 micrometer.

As will be described later, when the first reflective layer 130 is not disposed in the recess 111, the thickness of the phosphor layer 120 may be the same as the depth of the recess 111. In this case, the lower surface of the phosphor layer 120 may contact the bottom surface of the recess 111, and a side surface of the phosphor layer 120 may contact an inner surface of the recess 111.

The phosphor layer 120 may comprise one or two or more phosphor layers.

As shown in FIG. 7a, the phosphor layer 120 may comprise a single phosphor layer 121. For example, when the light irradiated in the light source (210 of FIG. 15) is blue light, a single phosphor layer 121 may comprise a yellow phosphor.

As shown in FIG. 7b, the phosphor layer 120 may comprise at least one or more first phosphor layers 122a and 122b and at least one or more second phosphor layers 123a and 123b.

For example, the first phosphor layers 122a and 122b may be disposed on half of the entire area of the recess 111 of the substrate 110, and the second phosphor layers 123a and 123b may be disposed on the other half area. That is, the first phosphor layers 122a and 122b may be disposed in a first region of the recess 111 corresponding to 0 degrees to 180 degrees along the circumference of the substrate 110, and the second phosphor layers 123a and 123b may be disposed in a second region of the recess 111 corresponding to 180 degrees to 360 degrees along the circumference of the substrate 110. In this case, the size (or area) of the first phosphor layer 122a and 122b and the size (or area) of the second phosphor layer 123a and 123b may be the same, but is not limited thereto.

For example, the first phosphor layer 122a and 122b and the second phosphor layer 123a and 123b may be alternately disposed along the circumference of the substrate 110. For example, a 1-1st phosphor layer 122a, a 2-1st phosphor layer 123a, a 1-2nd phosphor layer 122b and a 2-2nd phosphor layer 123b may be disposed in this order along the circumference of the substrate 110.

As shown in FIG. 7c, the phosphor layer 120 may comprise at least one or more first phosphor layers 124a and 124b, at least one or more second phosphor layers 125a and 125b and at least one or more third phosphor layers 126a and 126b.

For example, when the first to third phosphor layer 124a to 126b are provided by one each, the first phosphor layer 124a and 124b is disposed in a first region of the recess 111 corresponding to 0 degrees to 120 degrees along the circumference of the substrate 110, the second phosphor layer 125a and 125b is disposed in a second region of the recess 111 corresponding to 120 to 240 degrees along the circumference of the substrate 110, and the third phosphor layer 126a and 126b may be disposed in a third region of the recess 111 corresponding to 240 degrees to 360 degrees along the circumference of the substrate 110.

For example, the first to third phosphor layer 124a to 126b may be alternately disposed along the circumference of the substrate 110. For example, when the first to third phosphor layer 124a to 126b are provided by two each, each phosphor layer may be disposed in the region of the recess 111 corresponding to a range of 60 degrees along the circumference of the substrate 110.

In the drawings, the first phosphor layer 124a and 124b, the second phosphor layer 125a and 125b and the third phosphor layer 126a and 126b are disposed in order for the convenience of explanation, but the order is changeable.

In the drawing, each of the first phosphor layers 124a and 124b, the second phosphor layers 125a and 125b, and the third phosphor layers 126a and 126b have the same area, but are not limited thereto and may be disposed in different areas.

The first reflective layer 130 may surround the substrate 110.

For example, the first reflective layer 130 may be disposed on the upper surface of the substrate 110. For example, the first reflective layer 130 may be disposed in a lower surface of the substrate 110. For example, the first reflective layer 130 may be disposed on a side surface of the substrate 110. For example, the first reflective layer 130 may be disposed along the outer circumference of the substrate 110. As described above, since the first reflective layer 130 covers the substrate 110, the surface of the substrate 110 may be oxidized by high-temperature heat generated when the phosphor material is cured to form the phosphor layer 120. Accordingly, degradation of brightness performance can be prevented.

In addition, the first reflective layer 130 may be disposed in the recess 111, and may not be disposed.

When the first reflective layer 130 is disposed in the recess 111, the first reflective layer 130 may be disposed on the bottom surface and the side surface of the recess 111. For example, the first reflective layer 130 may contact the bottom surface and the side surface of the recess 111. In this case, the phosphor layer 120 may be disposed on the first reflective layer 130 in the recess 111. For example, the phosphor may contact the first reflective layer 130 in the recess 111. That is, the lower surface of the phosphor layer 120 may contact the first reflective layer 130 on the bottom surface of the recess 111. For example, the side surface of the phosphor layer 120 may contact the first reflective layer 130 on the inner surface of the recess 111.

The first reflective layer 130 may comprise a metal with excellent reflectivity. For example, the first reflective layer 130 may comprise one of nickel (Ni), aluminum (Al) and alloys thereof.

The thickness of the first reflective layer 130 may be about 100 micrometer to about 800 micrometer. When the thickness of the first reflective layer 130 is less than 100 micrometer, the first reflective layer 130 is uniformly difficult to be formed on the substrate 110. If the thickness of the first reflective layer 130 is more than 800 micrometer, the thickness of the phosphor wheel 100 may be thickened.

For example, a thermal conductivity of the substrate 110 may be greater than a thermal conductivity of the first reflective layer 130. Thus, heat generated in the phosphor layer 120 may be more easily transferred through the substrate 110 than through the first reflective layer 130.

The phosphor wheel 100 according to an embodiment may further comprise a reflective layer (140, hereinafter referred to as the second reflective layer).

The second reflective layer 140 may be disposed in, for example, recess 111. The second reflective layer 140 may increase light efficiency by increasing reflectance of light excited from the phosphor layer 120 disposed in the recess.

For example, if the first reflective layer 130 is not disposed in the recess 111, the second reflective layer 140 may contact the bottom surface of the recess 111. Even if the first reflective layer 130 is not disposed in the recess 111, since the second reflective layer 140 is disposed in the recess 111, light excited by the phosphor layer 120 is reflected by the second reflective layer 140, and light efficiency may be improved.

For example, when the first reflective layer 130 is disposed in the recess 111, the second reflective layer 140 may contact the first reflective layer 130 that contacts the bottom surface of the recess 111. When the first reflective layer 130 is disposed in the recess 111, the thickness of the second reflective layer 140 may be very thinly formed. That is, the thickness of the second reflective layer 140 may be formed thinner than when the first reflective layer 130 is not disposed in the recess 111.

As another example, nanoparticles or beads as a scattering agent instead of the first reflective layer 130 may be dispersed in the phosphor layer 120. In this case, the light excited in the phosphor layer 120 is scattered by the scattering agent to improve light efficiency. When the scattering agent is dispersed in the phosphor layer 120, the first reflective layer 130 may be disposed in the recess 111, and may not be disposed.

The second reflective layer 140 or scattering agent may comprise an inorganic material. For example, inorganic materials such as $TiO_2$ and the like can be used.

For example, the second reflective layer 140 may comprise member such as a paste, film, glass, sintering material, etc. in which nanoparticles or beads made of $TiO_2$ are dispersed.

The thickness of the second reflective layer 140 may be about 1 micrometer to about 200 micrometer. When the thickness of the second reflective layer 140 is less than 1 micrometer, it is difficult to form a uniform film such that the reflectivity is reduced. When the thickness of the second reflective layer 140 is more than 200 micrometer, the volume of the phosphor layer 120 in the recess 111 is smaller, the light efficiency excited by the phosphor layer 120 can be reduced.

For example, the thickness of the second reflective layer 140 may be about 1 micrometer to about 200 micrometer. For example, the thickness of the second reflective layer 140 may be about 1 micrometer to about 150 micrometer.

In the above, the first reflective layer 130 may be referred to as a second reflective layer, and the second reflective layer 140 may be referred to as a first reflective layer.

The phosphor wheel 100 according to an embodiment may further comprise a thermal radiation layer 150. The thermal radiation layer 150 may serve to dissipate the heat transmitted to the substrate 110 to the outside. The thermal radiation layer 150 may be called heat dissipation layer, an emission layer, and the like.

The thermal radiation layer 150 may be disposed on the substrate 110. For example, when the phosphor layer 120 is disposed on the recess 111 formed on the upper surface of the substrate 110, the thermal radiation layer 150 may be disposed on the lower surface of the substrate 110. In this case, as shown in FIG. 5, the heat generated in the phosphor layer 120 by the irradiation of the light source (FIG. 15 210) is quickly transmitted to the lower surface of the substrate 110 through the substrate 110, and thus the transmitted heat can be quickly dissipated to the outside through the heat radiation layer 150.

The thermal radiation layer 150 may be formed of a material with excellent thermal radiation properties. For example, the thermal radiation layer 150 may be formed of an inorganic material. For example, the thermal radiation layer 150 may comprise $SiO_2$, but is not limited thereto.

A thickness of the thermal radiation layer 150 may be less than the thickness of the first reflective layer 130. For example, the thickness of the thermal radiation layer 150 may be about 5 micrometer to about 20 micrometer. When the thickness of the thermal radiation layer 150 is less than 5 micrometer, the thermal radiation layer 150 is difficult to be uniformly formed. When the thickness of the heat radiation layer 150 is more than 200 micrometer, the thickness of the heat dissipation layer 150 is thickened and the heat transmitted through the substrate 110 is not well dissipated such that the heat dissipation characteristics may be reduced.

Although not shown, the first reflective layer 130 may not be disposed in the lower surface of the substrate 110. In this case, the thermal radiation layer 150 may contact the lower surface of the substrate 110. Accordingly, the heat generated in the phosphor layer 120 and transmitted to the substrate 110 can be immediately dissipated to the outside through the heat radiation layer 150 without passing through the first reflective layer 130 such that the heat dissipation efficiency can be improved.

On the other hand, according to an embodiment, the phosphor wheel 100 comprises a first to fourth layer, the first layer may comprise the substrate 110, the second layer may comprise the first reflective layer 130, the third layer may comprise the second reflective layer 140, the fourth layer may comprise the thermal radiation layer 150.

As shown in FIG. 13, in the comparative example, a phosphor layer is formed on the upper surface of a substrate made of sapphire, but in the embodiment, as shown in FIG. 2, the phosphor layer 120 was formed in the substrate 110 formed of metal and the recess 111 formed on the upper surface of the substrate 110.

The temperature of the phosphor layer 120 was measured, and the brightness of the projector was measured.

In the comparative example, the temperature is 146.8±2.7° C., whereas in the embodiment, the temperature is 138.9±4.4° C. Thus, it can be seen that the temperature in the example is approximately 7.9° C. lower than the temperature in the comparative example. This is due to the use of a metal such as copper (Cu) having excellent thermal conductivity as the substrate 110.

In addition, in the comparative example, the brightness is 3984±10 lm, whereas in the embodiment, the brightness may be 4634±3 lm. Thus, it can be seen that the brightness of the embodiment is increased by approximately 650 lm compared to the brightness of the comparative example. This is because the heat of the phosphor layer 120 is quickly transferred to the thermal radiation layer 150 by the substrate 110 including a metal such as copper (Cu) having excellent thermal conductivity, and the temperature of the phosphor layer 120 is reduced to improve light efficiency.

As shown in FIG. 14, a comparative example are not provided with a thermal radiation layer, whereas an embodiment is provided with a thermal radiation layer.

The temperature of the phosphor was measured, and the brightness of the projector was measured.

In the comparative example, the temperature is 156.0±4.0° C., whereas in the embodiment, the temperature is 149.5±1.5° C. Thus, it can be seen that the temperature in the embodiment is approximately 6.5° C. lower than the temperature in the comparative example. This is because the heat excited by the phosphor due to the excellent emission characteristics of the thermal radiation layer and transmitted through the substrate 110 is rapidly emitted to the outside through the thermal radiation layer.

In addition, the brightness may be 3841±47 lm in the comparative example, whereas the brightness may be 3930±30 lm in the embodiment. Thus, it can be seen that the brightness of the embodiment is increased by approximately 89 lm compared to the brightness of the comparative example. This is because heat is quickly dissipated from the heat radiation layer, and the temperature of the phosphor layer 120 is reduced, thereby improving light efficiency.

The Phosphor Wheel Manufacturing Process

FIG. 8 to FIG. 12 show a process of manufacturing a phosphor wheel according to an embodiment.

As shown in FIG. 8, the fastening hole 113 and the recess 111 may be formed on the substrate 110.

For example, the fastening hole 113 and the recess 111 may be formed using a chemical etching process, but is not limited thereto. After the fastening hole 113 is formed, the recess 111 may be formed, but is not limited thereto.

For example, the fastening hole 113 may be a throughhole through the upper surface and the lower surface of the substrate 110. Although not shown, the fastening hole 113 may be a groove (groove) or a recess 111 formed in the inner side at the lower surface of the substrate 110.

For example, the recess 111 may be formed along the circumference of the substrate 110 on the upper surface of the substrate 110. The recess 111 is a region where the phosphor layer 120 is to be formed later, and may have a predetermined depth so that the phosphor layer 120 is as close to the lower surface of the substrate 110 as possible. For example, the depth of the recess 111 may be more than half the thickness of the substrate 110. For example, the depth of the recess 111 may be about ½ to ¾ of the thickness of the substrate 110.

For example, the substrate 110 may comprise a metal such as copper (Cu).

As shown in FIG. 9, a first reflective layer 130 may be formed along the circumference of the substrate 110 including the fastening hole 113 and the recess 111. For example, the first reflective layer 130 may be formed using a plating process.

The first reflective layer 130 may comprise a metal with excellent reflectivity. For example, the first reflective layer 130 may comprise one of nickel (Ni), aluminum (Al) and alloys thereof.

The first reflective layer 130 may be formed in the entire region of the substrate 110. For example, the first reflective layer 130 may be formed on the upper surface, the lower surface and the side surface of the substrate 110. For example, the first reflective layer 130 may be formed on a bottom surface and an inner surface of the recess 111. For example, the first reflective layer 130 may be formed on an inner surface of the fastening hole 113.

As another example, the first reflective layer 130 may not be disposed on the bottom surface and the inner surface of the recess 111 and the inner surface of the fastening hole 113.

As shown in FIG. 10, a second reflective layer 140 may be formed on the recess 111 of the substrate 110.

For example, a paste containing nanoparticles or beads such as $TiO_2$ may be formed in the recess 111 and cured to form the second reflective layer 140.

The second reflective layer 140 may be formed using a printing process or a dispensing process, but is not limited thereto.

As shown in FIG. 11, the phosphor layer 120 may be formed in the recess 111 of the substrate 110. The phosphor layer 120 may be formed in the recess 111 using a printing process. For example, the printing process may comprise a screen printing process. As another example, the phosphor layer 120 may be formed in the recess 111 using a dispensing process.

For example, a substrate including a phosphor material may be formed in the recess 111 of the substrate 110, and the phosphor layer 120 may be formed in the recess 111 of the substrate 110 through a heat treatment process. For example, the heat treatment process may be performed at a temperature of about 150° C. to about 200° C. for about 1 hour to about 3 hours.

In the embodiment, since the first reflective layer 130 is disposed around the substrate 110 made of copper, the surface of the substrate 110 may not be oxidized even when a high-temperature heat treatment process is performed.

The phosphor layer 120 may comprise two or more phosphor layers (122a, 122b, 123a, 123b, 124a to 126b of FIG. 7c). In this case, each phosphor layer (122a, 122b, 123a and 123b of FIG. 7b, 124a to 126b of FIG. 7c) may be individually formed through the printing process and the heat treatment process. For example, as shown in FIG. 7b, the first phosphor material is heat-treated after being formed in the first region of the recess 111 using a printing process to form the first phosphor layer (122a, 122b of FIG. 7b). Thereafter, the second phosphor material is heat-treated after being formed in the second region of the recess 111 using a printing process to form a second phosphor layer (123a, 123b of FIG. 7b).

As shown in FIG. 12, the thermal radiation layer 150 may be formed on one side of the substrate 110. For example, the thermal radiation layer 150 may be formed on the lower side of the substrate 110.

For example, the thermal radiation layer 150 may be formed by the printing process and the heat treatment process. Specifically, the heat dissipation paste may be formed on the lower side of the substrate 110 by using the printing process. Spray coating process may be performed instead of the printing process. Then, by performing a heat treatment process for the heat dissipation paste formed on the lower side of the substrate 110, a thermal radiation layer 150 may be formed. For example, the heat treatment process may be performed at a temperature of about 150° C. to about 200° C. for about 1 hour to 3 hours.

For example, when the first reflective layer 130 is formed on the lower side of the substrate 110, the thermal radiation layer 150 may be formed on the lower surface of the first reflective layer 130.

In another example, when the first reflective layer 130 is not formed on the lower side of the substrate 110, the thermal radiation layer 150 may be formed on the lower surface when the substrate 110.

In the above, it has been described that the heat radiation layer 150 is formed after the second reflection layer 140 and the phosphor layer 120 are formed, but this is not limited thereto. That is, the heat radiation layer 150 may be formed first, and then the second reflection layer 140 and the phosphor layer 120 may be formed.

The phosphor wheel described above can be applied to a lighting system.

Lighting System

FIG. 15 shows a lighting system according to an embodiment.

Although the phosphor wheel 100 according to the embodiment is shown as being applied to a lighting system for a projector in FIG. 15, it can be applied to various fields.

Referring to FIG. 15, the lighting system 200 according to the embodiment may comprise a light source 210, the first and second mirrors 221 and 222, a phosphor wheel 100 and a color wheel 220. The lighting system 200 according to an embodiment may further comprise a plurality of lenses 231 to 236. Light can be converged by the plurality of lenses 231 to 236. The lighting system 200 according to the embodiment may comprise more components than these, but is not limited thereto.

The light source 210 may comprise a semiconductor light emitting device. For example, a light emitting diode device (LED) or a laser device may be used as a semiconductor light emitting device. For example, the light source 210 may emit blue light (241, hereinafter, hereinafter, called the first light).

The first light 241 may be irradiated onto the color wheel 220. The color wheel 220 is capable of rotating. A portion of the first light 241 may pass through the color wheel 220 as it is, and another portion may be reflected. The first light 241 reflected by the color wheel 220 may be reflected by the first mirror 221 and then irradiated to the phosphor wheel 100 via the second mirror 222. At least one or more light different from the first light 241 may be emitted by at least one or more phosphor layers 120 included in the phosphor wheel 100.

As shown in FIG. 15, the phosphor wheel 100 may comprise a first phosphor layer including yellow phosphor and a second phosphor layer including green phosphor. In this case, the yellow light (hereinafter referred to as the second light) and the green light (243, hereinafter, referred to as the third light) may be emitted by the phosphor wheel 100.

The second light 242 and the third light 243 emitted from the phosphor wheel 100 is reflected by the second mirror 222 may be irradiated with a color wheel 220.

As shown in FIG. 15, the color wheel 220 may comprise an orange wavelength conversion layer.

For example, when the color wheel 220 includes a yellow color, a green color, and an orange color, the second light 242 and the third light 243 are emitted as they are through the yellow and orange colors of the color wheel 230, respectively, and the second light 242 and the third light 243 may be emitted as fourth light that is orange light by an orange color.

Thus, white light may be formed by mixing the first light 241 passing through the color wheel 220 with the second to fourth lights generated by the phosphor wheel 100 and the color wheel 220.

The second to fourth lights are merely examples, and in an embodiment, two or four or more lights may be generated by the phosphor wheel 100 or the color wheel 220.

The above detailed description should not be construed in all respects as limited but should be considered illustrative. The scope of the embodiment should be determined by a reasonable interpretation of the appended claims, and any changes within the equivalent scope of the embodiment are included in the scope of the embodiment.

INDUSTRIAL APPLICABILITY

The embodiment can be applied to various fields using white light. For example, the embodiment may be applied to a projector.

The invention claimed is:
1. A phosphor wheel, comprising:
a substrate comprising a recess;

a first reflective layer configured to surround the substrate and disposed on a bottom surface and an inner side surface of the recess;

a second reflective layer disposed on the first reflective layer corresponding to the bottom surface of the recess; and a phosphor layer configured to be in contact with the first reflective layer on the inner side surface of the recess and be in contact with the second reflective layer on the bottom surface of the recess.

2. The phosphor wheel of claim 1, wherein the substrate has a circular shape, and the recess is disposed along a circumference of the substrate.

3. The phosphor wheel of claim 1, wherein the recess has a closed-loop shape.

4. The phosphor wheel of claim 1, wherein a depth of the recess is ½ to ¾ of a thickness of the substrate.

5. The phosphor wheel of claim 1, wherein the substrate comprises a first metal, and the first reflective layer comprises a second metal.

6. The phosphor wheel of claim 5, wherein the first metal has a higher thermal conductivity than the second metal.

7. The phosphor wheel of claim 5, wherein the second reflective layer comprises an inorganic material different from the first metal of the first reflective layer, and wherein the first metal comprises Cu, the second metal comprises one of nickel (Ni), aluminum (Al) and alloys thereof, and the inorganic material comprises $TiO_2$.

8. The phosphor wheel of claim 1, further comprising: a thermal radiation layer disposed on the substrate.

9. The phosphor wheel of claim 8, wherein the thermal radiation layer comprises an inorganic material.

10. The phosphor wheel of claim 1, wherein the phosphor layer comprises at least one or more phosphor layers that receive a laser light of a first wavelength band and emit light of at least one or more wavelength bands.

11. The phosphor wheel of claim 1, wherein the phosphor layer is made of one of YAG, LuAG, α, —SiAlON, and β—one of SiAlON.

12. The phosphor wheel of claim 1, wherein the phosphor layer is made of a phosphor composition that is excited at a wavelength of 430 nm to 470 nm and emits visible light.

13. The phosphor wheel of claim 1, wherein the phosphor layer comprises one of phosphor and silicon resin, phosphor and powder particles, phosphor and glass powder particles, and ceramic phosphor.

14. A lighting system, comprising:
a light source configured to generate a laser light of a first wavelength band; and
a rotatable phosphor wheel configured to receive the laser light of the first wavelength band and emit light of at least one or more wavelength bands,
wherein the rotatable phosphor wheel comprises:
a substrate comprising a recess;
a first reflective layer configured to surround the substrate and disposed on a bottom surface and an inner side surface of the recess;
a second reflective layer disposed on the first reflective layer corresponding to the bottom surface of the recess; and
a phosphor layer configured to be in contact with the first reflective layer on the inner side surface of the recess and be in contact with the second reflective layer on the bottom surface of the recess.

15. The lighting system of claim 14, wherein the light source comprises a blue laser light emitting device.

16. A projector comprising the lighting system according to claim 14.

17. The phosphor wheel of claim 1, further comprising:
a fastening hole in the substrate, wherein
the phosphor layer completely surrounds the fastening hole in plan view, and
the first reflective layer completely surrounds the fastening hole in plan view.

18. The phosphor wheel of claim 1, further comprising:
a thermal radiation layer disposed on the substrate, wherein
the recess and phosphor layer are disposed on a first side of the substrate,
the thermal radiation layer is disposed on a second side of the substrate opposing the first side, and
the thermal radiation layer overlaps an entirety of the recess in plan view.

19. The phosphor wheel of claim 1, wherein the phosphor layer includes a scattering agent dispersed within.

* * * * *